Jan. 31, 1961 W. E. REED 2,969,640
PRESSURE RATIO SENSING, INDICATING, AND CONTROLLING APPARATUS
Filed Aug. 25, 1953 5 Sheets-Sheet 1

INVENTOR
WENDELL E. REED
BY
ATTORNEYS

Jan. 31, 1961 W. E. REED 2,969,640
PRESSURE RATIO SENSING, INDICATING, AND CONTROLLING APPARATUS
Filed Aug. 25, 1953 5 Sheets-Sheet 2

INVENTOR
WENDELL E. REED
BY *Strauch, Nolan & Diggins*
ATTORNEYS

Jan. 31, 1961 W. E. REED 2,969,640
PRESSURE RATIO SENSING, INDICATING, AND CONTROLLING APPARATUS
Filed Aug. 25, 1953 5 Sheets-Sheet 5

*INVENTOR.*
WENDELL E. REED
BY
Strauch, Nolan & Diggins
ATTORNEYS

United States Patent Office 2,969,640
Patented Jan. 31, 1961

2,969,640

PRESSURE RATIO SENSING, INDICATING, AND CONTROLLING APPARATUS

Wendell E. Reed, San Diego, Calif., assignor to Solar Aircraft Company, San Diego, Calif., a corporation of California Filed Aug. 25, 1953, Ser. No. 376,337

8 Claims. (Cl. 60—35.6)

This invention relates to sensing, indicating and control apparatus for use in conjunction with fluid flow systems and more particularly to flow indicating and control devices which are responsive to variations in the properties and characteristics of fluids flowing in such systems as gas turbines, reaction engines, chemical processing apparatus, pipe lines, wind tunnels and the like.

This application is a continuation-in-part of copending application Serial No. 140,856, now Patent No. 2,746,242, which discloses and claims one form of the invention which is particularly useful in connection with the control of turbo-jet engines, especially those equipped with afterburners.

The additional form of the invention disclosed in the present application is of more general utility, principally because of its greater sensitivity and reliability, and because of the fact that its performance is substantially unaffected by variations in environmental conditions.

To indicate the versatility of the apparatus of the present invention, it will be disclosed in several widely varying environments, in each of which it has produced results heretofore unobtainable. Specifically, the invention will be disclosed as a jet engine control, as a flow ratio control, and as a remote temperature control. From these widely varying applications other uses and applications will be suggested.

At present the invention has achieved its most notable success in the field of jet engine control.

As is well known in the art, successful methods and apparatus have been developed to augment the mass and velocity of the exhaust gases of conventional jet engines to increase their thrust by injecting and burning additional combustible elements in the unburned exhaust gas components by means of an afterburner. Such afterburners, which are generally used only during take-off or during unusual flight conditions, produce, in a fraction of a second, temperature and pressure variations in the engine, which, if not immediately compensated for, may either destroy or seriously damage the engine or produce a fatal loss of thrust.

For example, if an afterburner is switched on during normal flight it increases the output flow of exhaust gases from about 2250 c.f.s. to 4200 c.f.s. in the fraction of a second required for ignition. Compensation for this large and rapid increase in the mass of the exhaust gases is accomplished by enlarging the tail pipe nozzle. Conversely, if the afterburner is switched off or blown out, an immediate reduction in the mass of the exhaust gases occurs, which, if not promptly compensated for by the reduction of nozzle area produces a loss of thrust which may endanger the air craft. Immediate correction of the nozzle area is critical, for a single erroneous or delayed operation may result in the loss of a plane and its occupants.

For safe and efficient operation either during afterburning or non-afterburning conditions the turbine discharge temperature should be maintained at a substantially constant maximum and the turbine discharge pressure should be maintained at a balanced cycle condition, which exists during operation at sea level with no afterburning and with the aircraft at rest and the variable nozzle at minimum opening or with afterburning and the variable nozzle set at maximum opening. This "normal" discharge pressure which is determined principally by r.p.m., air speed ambient temperature and compressor efficiency, is found at any altitude of operation at the entrance to the tail pipe of a turbo-jet power plant under the above stated conditions.

Unavoidable variations in fuel flow and other factors cause the turbine discharge pressure to depart from "normal" either during afterburning or non-afterburning conditions and such variation, if exceeding a permissible limit, are compensated for by trimming the variable area nozzle.

It will be appreciated that the pressure level of the operating cycle of a turbo-jet engine is considerably lower at altitude than at sea level. For example, at full military r.p.m. at sea level, a specific jet engine has a compressor discharge pressure of 93.8 p.s.i.a. and a turbine discharge pressure of 35.2 p.s.i.a. At full military r.p.m. the same engine at fifty-five thousand feet has a compressor discharge pressure of 16 p.s.i.a. and a turbine discharge pressure of 6 p.s.i.a.

It has been found that the variations in tail-pipe pressure occasioned by afterburner light-off or blow-out are a substantially constant percentage of the tail-pipe absolute pressure at a given altitude and the absolute pressure changes accordingly vary widely with altitude. This fact is chiefly responsible for the failure of the many prior pressure responsive control devices and systems which are sensitive only to absolute pressure variations of a given magnitude. It is for this reason that the control apparatus shown in the aforesaid Patent No. 2,746,242 which was the most effective pressure control device known prior to the improved form of the invention herein disclosed has an operational ceiling of about 40,000 feet.

It is essential in control apparatus of this kind that a "dead band" area be provided to prevent response of the control apparatus to the continual minor and insignificant variations in turbine discharge pressures to prevent undesirable intermittent opening and closing of the variable nozzle. Such permissible variations in the absolute turbine discharge pressure also decrease significantly with altitude. However, the percentage variation remains substantially constant.

For example a variation of 1 to 2% from the predetermined normal turbine discharge pressure is permissible at all altitudes. If the control device has a "dead band" of approximately 1.5 p.s.i.a. at sea level the absolute pressure increase of 9 p.s.i.a. at afterburner light-off and the decrease of 5 p.s.i.a. at blow-out will activate the control apparatus and effect the required nozzle adjustment. However, at 40,000 feet the turbine discharge pressure increases only 1.95 p.s.i.a. at light-off and decreases only 1.5 at blow-out of the afterburner. Accordingly, at altitudes in excess of 40,000 feet, the pressure changes produced by afterburner light-off or blow-out either fall within the dead band of all known prior pressure responsive nozzle control devices or are too small to afford the desired control response. The operational ceiling of such devices can be increased to some extent only by decreasing the sea level dead band which renders the system susceptible of inadvertent operation due to transient permissible tail pipe pressure variations.

Prior proposed temperature responsive devices have been far too sluggish and uncertain to follow rapidly changing operational conditions and to provide the practically instantaneous response required to protect the aircraft.

The present invention and particularly the preferred embodiment, overcomes the foregoing disadvantages of the prior efforts and failures to solve the jet power plant afterburner signalling and control problems by utilizing a novel method and apparatus for producing a sustained reference pressure equivalent to, or bearing a predetermined relation to, the normal turbine discharge pressures during the widely varying operating conditions met by such power plants, and using the differential between the reference pressure and the actual turbine discharge pressure to operate any desired type of signalling or control mechanism.

In its preferred embodiment the invention consists essentially of a flow box or device having two orifices in series, the downstream orifice being controlled as a function of a differential pressure applied to a pressure responsive member. In another of its forms the invention comprises a flow box or device having exit and entrance orifices which are fixed in operation.

In either of its primary forms the sensing and control unit of the present invention forms a duct which is the analogue of another duct which may be a part of the system to be controlled or an independent duct associated with the system to be controlled.

The preferred form of the invention eliminates springs and other resilient devices which have limited the range of effective operation of prior devices and it is substantially independent of changing pressure levels in operating fluids and ambient surrounding atmosphere. For these reasons and others, including its sensitivity and speed of response it is ideally suited for the sensing and control of other fluid systems as will more fully appear hereinafter.

It is, accordingly, the primary purpose and object of the present invention to provide novel pressure responsive control systems, methods and apparatus.

It is also an object of the invention to provide novel sensing and control devices operable solely in response to variations in pressure from a prescribed normal.

It is a further object of the present invention to provide novel pressure responsive control units of small size and light weight which substantially completely eliminate mechanical resiliency and which are unaffected by changes in ambient pressure levels to provide a uniform response at all altitudes at which turbo-jet engines are able to function efficiently.

It is an additional object of the present invention to provide novel pressure control units capable of sensing small variations between the ratios of a reference pressure and one or more operating pressures or between a reference pressure, one or more operating pressures and ambient pressure.

It is a further and more specific object to provide a novel pressure sensitive control device which when applied to jet engine control systems provides a control signal the magnitude of which is a direct function of the error in jet engine turbine pressure ratio above or below the desired balanced cycle ratio.

It is also an important object of the present invention to provide novel compact pressure sensitive control units which are substantially insensitive to acceleration forces, vibration, temperature gradients and other operating conditions such as those encountered, for example, on an aircraft at all stages of operation from static sea level to supersonic speeds at altitudes in excess of 60,000 feet.

It is a further object of the present invention to provide novel pressure responsive control devices which are capable of controlling the flow of operating fluids to maintain a predetermined constant pressure ratio between points in the fluid system despite wide variations in ambient pressures or in the pressure level of the operating cycle.

It is another object of the present invention to provide novel pressure sensing, indicating and control devices which have a substantially constant sensitivity value, which are substantially free from inertia effects and spring and friction losses and which are capable of practically instantaneous action when actuated by pressure variations of a predetermined percentage.

It is an additional object of the present invention to provide novel pressure responsive control devices which are self-compensating under all conditions and provide a substantially constant sensitivity value despite sudden and major variations in pressures to which they are subjected.

It is another object of the invention to provide novel control systems which are self-balancing, thus eliminating hunting and pendulum action.

It is also an object of the present invention to provide novel control devices and systems which are responsive to constant percentage variations from a predetermined pressure norm.

It is a further object of the present invention to provide novel control devices and systems for controlling a variable jet nozzle associated with a turbo-jet power plant over a wide range of operating conditions.

It is also an object of the present invention to provide novel pressure responsive control units which are compact, inexpensive, lightweight, simple and dependable.

It is a more specific object to provide improved jet engine control units which may be installed on existing equipment with a minimum of modification.

Other objects will become apparent as the description proceeds in connection with the accompanying drawings in which.

Figure 1:
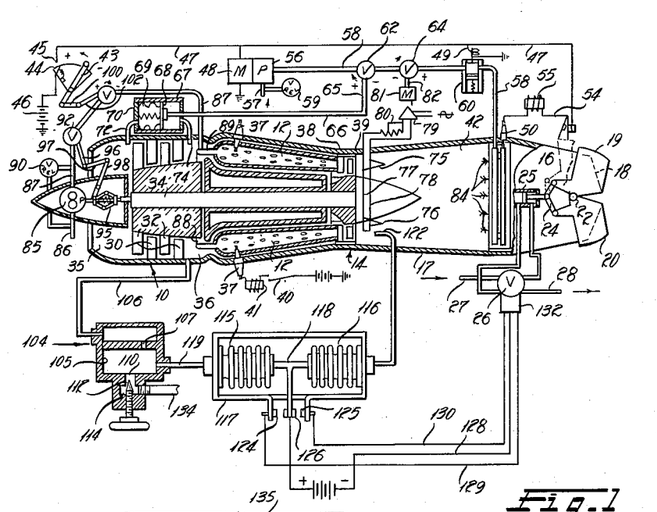
Figure 1 is a schematic diagram of a conventional turbo-jet engine equipped with an afterburner and with a sensing system in accordance with one form of the invention and a fuel control system for the primary burner and afterburner.

Figure 1 shows schematically a turbo-jet engine of conventional type, having a compressor 10, a primary burner 12, a turbine 14, and an afterburner 16, located in a tailpipe 17. The outlet nozzle 18 of the tailpipe is of such diameter as to handle all of the exhaust gases when both the turbo-jet engine and the afterburner are in operation without increasing the normal discharge pressure. The primary burner may operate with or without the afterburner, but the afterburner is never operated alone. To provide proper tailpipe or nozzle areas a pair of gates 19 and 20 are pivotally mounted upon the tailpipe at 22 and so arranged that when they fully open during afterburning the full discharge area of the nozzle 18 is open and when they are closed the remaining effective area is that required to maintain a normal turbine discharge pressure when the afterburner is not in operation.

The gates 19 and 20 are operated through a linkage system 24 by a fluid motor 25 which is connected to a four way fluid valve 26 that delivers fluid to the right end of the motor 25 to open the gates, or to the left end of the motor to close the gates. Fluid under pressure is supplied by line 27, and fluid discharged from the inactive end of motor 25 is directed by the valve 26 to the exhaust line 28.

In the turbo-jet engine itself the compressor includes stationary blade or nozzle rings 30 which cooperate with rotating blade rings 32 mounted upon a driven shaft 34 to compress the air entering at 35 and to deliver it to the compressor outlet passage 36.

The compressed air then enters the primary burner 12 where it is mixed with fuel ignited by spark plugs 37, burned, and the products of combustion delivered to the turbine 14 through guide vanes 38, and thence to turbine blades 39 fixedly mounted upon shaft 34 to supply power thereto to rotate it and drive the air compressor 10. Spark plugs 37 may be energized by any suitable method which closes switch 40 so that current passes through spark coil 41 to plug 37, and need remain energized only long enough to initiate burning after which switch 40 is opened deenergizing plugs 37.

Leaving turbine 14, the gases enter a turbine discharge passage 42 in the upstream end of the tailpipe or diffuser 17. Thence the gases pass through the afterburner 16 and out the tailpipe through the nozzle 18.

To place the afterburner 16 in operation throttle 43, Figure 1, is moved in the plus direction to its full open position which will cause movable contact 44 and fixed contact 45 to be closed. Closing contacts 44 and 45 causes current from a suitable source as battery 46 to flow through conductor 47 which supplies current simultaneously to pump motor 48, solenoid coil 49 and ignition plug 50, the current to plug 50 passing through normally closed contacts 52 and 53, conductor 54 and spark coil 55. Pump motor 48 drives the rotary gear pump 56 connected at its intake side by conduit 57 to a fuel supply, not shown, and connected at its discharge side to conduit 58 leading to afterburner 16. A conventional relief valve 59 is connected between intake conduit 57 and discharge conduit 58. Also mounted in conduit 58 are the three control valves 60, 62 and 64. Valve 60 is a two-position shut-off valve which will be opened as soon as solenoid coil 49 is energized upon closing contacts 44 and 45, and closed upon deenergization of coil 49. Valves 62 and 64 are provided to control the amount of fuel pumped to afterburner 16 and are responsive to variation in pressure rise across compressor 10 and temperature immediately down stream of turbine 14, respectively.

The control element, not shown, of valve 62 is secured to an arm 65 which is loosely fixed at its lower end to a rod 66 extending into an airtight cylinder 67. Within the cylinder 67 rod 66 is secured to a spring biased piston 68 forming one end of a bellows 69. The other end of bellows 69 is formed by the end 70 of cylinder 67. Piston 68 is exposed on its bellows side to inlet or ram air pressure entering the bellows through line 72, and on its free side to compressor outlet pressure through line 74 so that any relative change in pressure across compressor 10 will be reflected by movement of piston 68 and the control element of valve 62. As shown by the arrow, valve 62 will move in a plus or fuel increasing direction in response to an increase in pressure rise across compressor 10. Valve 62 varies the primary control of the fuel supply to the afterburner, the regulation being a function of altitude, engine r.p.m. and air speed.

Valve 64 is controlled by thermocouples 75 and 76 or other thermally responsive devices immediately downstream of turbine 14. As is well-known in the art, thermocouples produce a millivolt D.-C. power which varies in accordance with the temperature changes of their environment. Thermocouples 75 and 76 are connected to conductors 77 and 78. Conductor 78 leads directly into a conventional amplifier-converter 79 of a type similar to that disclosed in United States Patent No. 2,368,701 to Borden which is supplied by an A.-C. source, while conductor 77 passes through the potentiometer 80 before it leads to amplifier-converter 79 as is conventional in such temperature indicating and control circuits. The amplifier-converter 79 supplies power proportional to the signal received from thermocouples 75 and 76 to a reversible variable-speed motor 81 of any suitable type which is connected to valve 64 through drive shaft 82. This temperature responsive control is arranged to operate valve 64 in a fuel decreasing or minus direction in response to an increase in the temperature in the turbine discharge region. The primary function of the thermocouples and the thermocouple controlled valve is to allow the afterburner to heat to the greatest degree possible commensurate with safe temperatures within the metals. Because the thermocouples are a temperature-sensitive device, they make it possible to use top temperatures in the final degree of afterburning which are somewhat hotter than would be possible relying solely on the more rapid but less sensitive signals of the pressure system.

As explained hereinbefore, the closing of contacts 44 and 45 send current to ignition plug 50 which will ignite the fuel being introduced into the diffuser 17 just upstream of afterburner 16 as shown at 84 to start the afterburning. Since the plug 50 need be energized only long enough to start the afterburning, the contacts 52 and 53 are opened when gates 19 and 20 are in their fully open position in any suitable manner, for example as shown diagrammatically by a gate in dotted lines in Figure 1, and as will be more fully explained hereinafter.

Fuel is supplied to the primary burner from the fuel supply, not shown, by means of rotary gear pump 85 driven by main engine shaft 34. Fuel enters the pump through conduit 86 and is discharged into conduit 87 which connects with an annular conduit 88 and the fuel injection nozzles 89 for the primary burner, all of which are conventional. A relief valve 90 of any suitable design connects conduits 86 and 87 on either side of pump 85. Also fixed in the conduit 87 are the fuel control valves 92 and 94. Valve 92 is controlled by a fly-ball governor 95 mounted on shaft 34 with its inner end fixed to the shaft and its outer end slidable on the shaft. A suitable linkage, such for example as diagrammatically illustrated by arm 96, arm 97 and arm 98 pivoted at 99, transmits the movement of the outer end of governor 95 to the control element, not shown, of valve 92. An increase in the speed of rotation of shaft 34 will cause valve 92 to be moved in a minus or fuel decreasing direction. Valve 94 is controlled by the throttle 43 through a linkage such as levers 100 and 102, and any movement of the throttle 43 in either direction is transmitted directly to valve 94. It should be noted that the primary control of fuel to the primary burner is achieved by throttle controlled valve 94, the governor controlled valve 92 serving only to maintain turbine speed below some predetermined permissible maximum.

With the afterburner 16 not in operation gates 19 and 20 are closed, as shown, and the outlet passage from nozzle 18 is thereby reduced to its smallest opening. When the afterburner is placed in operation it adds additional fuel to the exhaust gases (which have a surplus of air in turbo-jet engines) and the mixture is largely burned before it discharges through the nozzle 18, thereby increasing the temperature and hence the volume of the exhaust gases. If the discharge pressure is allowed to increase over a "normal" value, the turbine will be slowed, the speed responsive governor 95 will supply more fuel, and the temperatures resulting from the burning gases in the primary burner 12 may reach destructive levels. To maintain a normal turbine discharge pressure after the afterburner has been placed in operation the nozzle 18 must immediately be enlarged by opening gates 19 and 20. For that reason I control variation of the size of nozzle 18 in novel manner by means of a reference pressure which constantly simulates the previously defined "normal" turbine discharge pressure. Accordingly, in my invention actual control of the nozzle opening is dependent upon the difference between the said normal turbine discharge pressure (as represented by the pressure in chamber or cavity 105, as will be described) and the actual turbine discharge pressure for any operating condition.

Figure 2:
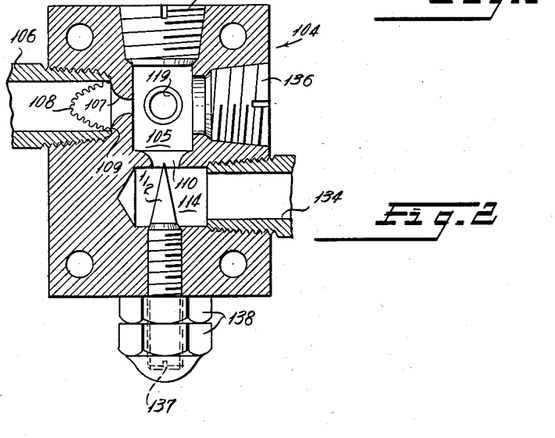
Figure 2 is a sectional view of one of the elements of the sensing system shown schematically in Figure 1.

Referring again to Figure 1, at 104 the instrument shown in detailed construction in Figure 2, which may be aptly described as a variable comparison pressure device, is schematically illustrated. The body of the pressure device 104 has a central chamber or cavity 105 which is connected to a pipe 106 via an orifice 107 which may have a removable filter screen 108 attached to a flange 109 held in place as by pipe 106. The pipe 106 is connected to the engine so as to have its inlet subject to the static pressure of the air at the compressor outlet passage 36. It is subjected to the pressure at this point rather than that at the turbine inlet and immediately downstream of the combustors because the gas temperatures reaching the turbine inlet may be 1200° F. or higher and may include sundry solid particles of combustion which tend to deposit in the pipe 106 and the filter screen 108. The static pressure in the compressor outlet passage 36 will be higher than the ambient pressure. The central cavity 105 of the pressure device 104 besides being connected to the pipe 106 is provided with a second orifice 110 the area of which is controlled by a needle valve 112. Orifice 110 connects with a passageway 114 which is in direct communication with a zone of ambient atmospheric pressure in such manner that the pressure in passageway 114 will be maintained substantially at ambient air pressure. Air will therefore flow through pipe 106 and orifice 107 into the cavity 105, and then through orifice 110 to the atmosphere. A feature of this cavity is that the orifices are not in line so that the orifice 110 will not be affected by the velocity head occasioned by flow through orifice 107.

The needle valve 112 is so adjusted with respect to orifice 110, and both orifices 107 and 110 are of such diameter and configuration that the pressure drop through the orifice 107 closely approximates the pressure drop through the turbine 14. The pressure drop through the orifice 110 closely approximates the pressure drop through the tailpipe 17 when the afterburner 16 is not operating and the area of nozzle 18 is smallest by reason of gates 19 and 20 being closed. Figure 2, hereinafter described in detail, shows by way of example a scale section through an actual device found practical in one application of the invention.

Pressure drop through the primary burner 12 is balanced out closely by subjecting the inlet of pipe 106 solely to static pressure at the compressor discharge rather than to combined static and velocity head at the inlet to the turbine 14. As a consequence, the pressure in the cavity 105 of the pressure device 104 is the equivalent for any operating condition, of the "normal" turbine discharge pressure.

In the schematic diagram of Figure 1 a pair of resilient bellows or Sylphons or the like are diagrammatically indicated at 115 and 116, with their outer ends fixed to a suitable frame 117 and their inner facing ends rigidly connected to a T-shaped element 118. The bellows 115 is connected to a pipe 119 which connects the interior of the bellows with cavity 105. The interior of bellows 116 is connected to a pipe 120 having at its other end an open entrance facing upstream at 122 in the tailpipe 17 at the turbine discharge, so that the interior of the bellows 116 is subjected to the combined static and velocity head of the exhaust gases from the turbine. The bellows or Sylphons 115 and 116 are resiliently balanced so that when the internal pressure within them is equal they will assume a zero or neutral position.

Also mounted upon the frame 117 are a pair of electrical contacts 124 and 125 on opposite sides of a central contact 126 that is carried by the depending leg of the T-shaped element 118. The contacts 124 and 125 are so located with respect to the contact 126 that they are equally spaced therefrom when the bellows 115 and 116 are in neutral position, and so that either one or the other will be engaged by the movable contact 126 when a differential of the pressures in bellows 115 and 116 causes a shifting of the element 118. The contacts 124, 125 and 126 form part of an electric circuit which includes a batery or source of E.M.F. 127, wires 128, 129 and 130, and a motor 132 that drives the valve 26 in either direction to open or close the gates 19 and 20, depending on whether the central contact engages contact 124 or 125. The battery 127 will be in the circuit to drive the motor irrespective of whether the central contact 126 engages contact 124 or 125.

The illustrated pressure device 104 and orifices are believed to give a sufficiently close approximation to be suitable for any of the known aircraft jet engines and it is well within the scope of aerodynamicists to design orifices suitable to simulate the pressure drop through any other engine and tail pipe where such a reference pressure is desired for the control of a nozzle control of fuel or for any other indication or control purpose.

Figure 2 shows to scale a section through a pressure device that is operative in the desired manner. The body of the pressure device has its orifice 107 in direct alignment with the pipe 106 that leads to the compressor discharge pressure. The walls of the orifice 107 are rounded on the high pressure side, as are the walls of the orifice 110 on its side facing the cavity 105. In this example orifice 107 is 0.116 inch diameter and orifice 110 is 0.185 inch diameter, and the rounded high pressure sides of both orifices have radii of roughly 0.094 inch to give the desired flow characteristics or more specifically to simulate pressure drops through turbine 14. Passageway 114 which is connected to a zone of ambient pressure is threaded to receive a conduit 134 that leads to such a zone. The connection between pipe 119 and the cavity 105 is shown perpendicular to the plane of the drawing. Two other openings to the cavity 105, for such use as may be needed, are shown closed by threaded plugs 135 and 136.

In practice it is desirable to have an adjustment for either orifice 107 or 110. Needle valve 112 which adjusts the discharge to ambient atmosphere through orifice 110 has a screwdriver slot 137 and is locked in adjusted position by a pair of nuts 138. After initial adjustment of orifice 110 has once been made for a particular power plant unit the cavity 105 will thereafter be maintained at a pressure less than compressor discharge and bearing the same relation to compressor discharge pressure as does the turbine discharge pressure if the engine is operated with a normal tailpipe having a fixed jet nozzle. Any pressure actuated device such as a pressure switch or transducer can then be connected to the cavity 105 and to the turbine discharge pressure sensing pipe 120 to control any desired operation in response to difference in pressure between these points.

*Operation*

To illustrate operation of the form of the invention thus far described let it be assumed that the afterburner 16 is not in operation and that nozzle 18 is properly set to maintain a normal turbine discharge pressure. Under these conditions the gates 19 and 20 will be fully closed. With a normal turbine discharge pressure the pressure within the pipe 120 will be equal to the pressure in the cavity 105 of the pressure device 104, and the bellows 115 and 116 will center the contact 126 between the other contacts 124 and 125. Now if the afterburner 16 is set in operation there will be a great increase in temperature and hence in volume of exhaust gas seeking to exhaust through the restricted nozzle 18. This will increase the turbine discharge pressure above the normal value because of the back pressure developed in the tailpipe. The increased pressure will be transmitted through the pipe 120 to the interior of bellows 116 and the increased pressure therein will cause the movement of the contact 126 to the left to engage contact 124, closing the circuit to motor 132 to rotate it in a direction to operate valve 26 so that fluid is delivered to the right end of fluid motor 25. This separates or opens the gates 19 and 20 until the pressure in the tailpipe is reduced and the turbine discharge pressure again becomes normal. When this condition is reached, the contact 126 will disengage contact 124, stopping the motor 132 and locking the hydraulic motor 25 in the position to which it was last moved. When the afterburner operation is discontinued the action is reversed in that contact 126 moves to engage contact 125 with the result that the electric and fluid motors 132 and 25 operate to move the gates 19 and 20 to closed position.

It will be appreciated by those skilled in the art that the system can be utilized to cause the variable elements of a continuously variable nozzle to be continuously adjusted in accordance with fluctuating turbine discharge pressures to keep that pressure at its normal value. Continuously variable nozzles of types well known in the art can be used in such combination. It can also be utilized to merely shift the gates 19 and 20 illustrated in Figure 1 to either full open or full closed position in accordance with the larger changes in tailpipe pressure resulting from afterburner operation or discontinuance as explained hereinbefore. Also, instead of the system controlling the nozzle as by means of the gates 19 and 20, it could be used to automatically increase or decrease the supply of fuel to the afterburner to maintain a normal turbine discharge pressure, in which event the variation in size of the nozzle 18 required when afterburning is started or stopped could be controlled either by some automatic device or by hand. It can also be utilized to control the turbine discharge pressure when water injection is introduced.

Although the form of the invention thus far described provides a sensitive, reliable, fast-acting control system suitable for many applications it nevertheless has a practical service ceiling of 40,000 feet and is thus unsuited for many military applications.

The improved form of the invention shown in detail in Figures 3 through 8 is completely unaffected by altitude changes and is substantially free of mechanical resiliency and, consequently, is the preferred form of the invention.

In addition to detailed refinements which improve its overall operation, the preferred form of the invention now to be described differs from that previously described in two essential respects. First, the downstream orifice 110, which, in operation, is of constant area is replaced by a variable area orifice, the area of which is controlled as a function of a differential pressure applied across a pressure responsive device. Secondly, the bellows units 115 and 116, which because of their mechanical resilience or spring rate introduce error particularly at high altitudes, are replaced by a relatively large single diaphragm which has mechanical resilience of such low value as compared to the applied forces as to introduce negligible error at all altitudes in which jet engines are operational.

Referring now more particularly to Figures 3 through 8 which disclose the preferred embodiment of the invention in one of its most successful applications, 150 indicates generally a turbo-jet engine generally similar to that shown in Figure 1. The engine has a compressor 152, a primary burner 154, a turbine 156, an afterburner 158 mounted in a tailpipe 160 and a continuously variable area nozzle 162 which may take any of a number of conventional forms.

Figures 3, 7, 8:
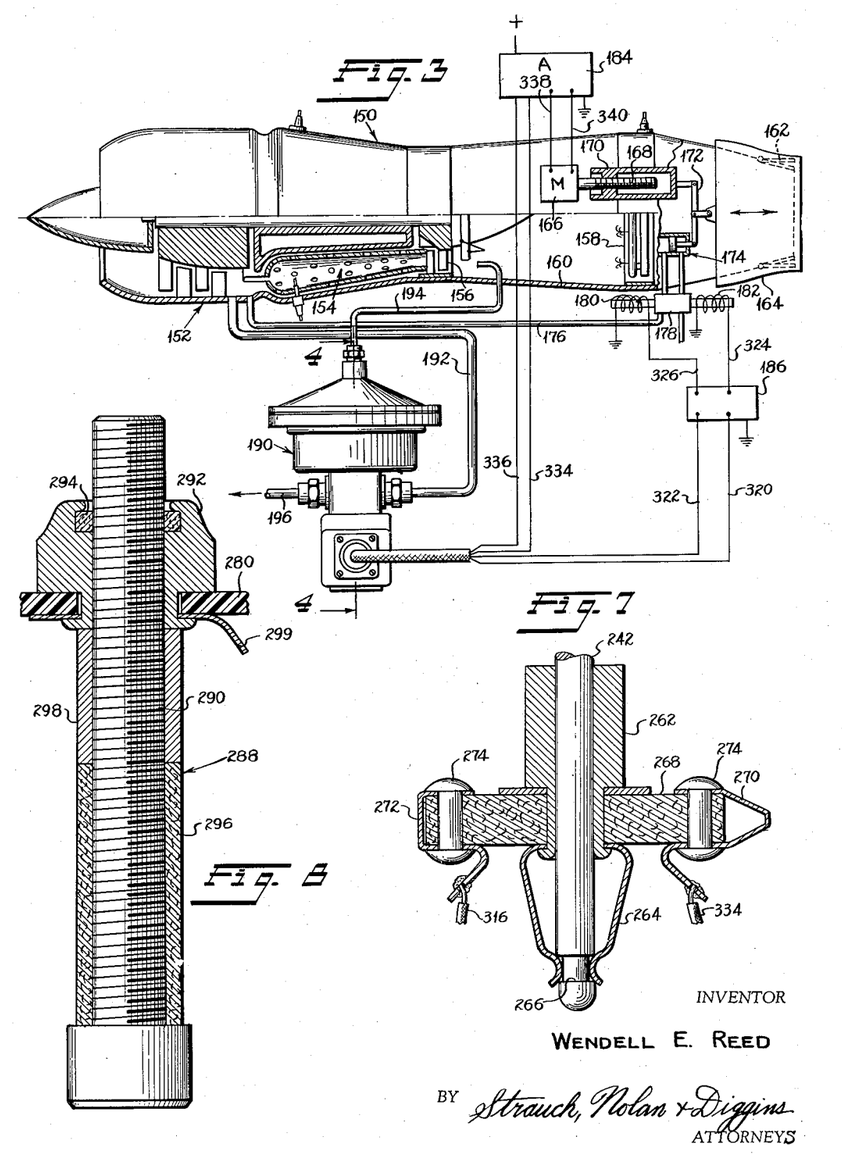
Figure 3 is a view similar to Figure 1 illustrating the preferred form of the invention as applied to a jet engine equipped with an afterburner and a fully variable nozzle.
Figure 7 is an enlarged sectional view taken along line 7—7 of Figure 6.
Figure 8 is an enlarged section taken along line 8—8 of Figure 5.

The details of the controls for the primary engine and for the afterburner have been omitted from Figure 3 for clarity and may be of the same general nature as those shown in Figure 1 or may take other conventional forms.

The area of the nozzle 162 is varied by movement of the shroud 164 axially of the engine, movement toward the right as viewed in Figure 3 decreasing the size of the nozzle and movement toward the left increasing the size of the nozzle. Vernier movement is effected by means of a reversible motor 166, the drive shaft 168 of which moves a traveling nut 170 connected to the shroud 164 through a suitable linkage including lever 172. Rapid and major displacements of the nozzle are effected through a pneumatic power mechanism indicated generally at 174 also connected to the common lever 172. Operating fluid for the power mechanism 174 is bled from the compressor discharge through a conduit 176 and supplied selectively to the opposite ends of the power piston by a valve 178 actuated by solenoids 180 and 182. Actuating signals are supplied through amplifiers 184 and 186 to the motor 166 and the valve 178, respectively, by the control unit indicated generally at 190 with which the present invention is primarily concerned.

This unit, which replaces the unit 104 of Figure 1 and the associated bellows and contact mechanism is dynamically connected to the jet engine in essentially the same way as the unit of Figure 1. Specifically, the unit is connected through a conduit 192 to compressor discharge and through a conduit 194 to the turbine discharge area. Conduit 196 (rotated 90° from its actual position) leads to any low pressure area of the aircraft preferably an area where atmospheric pressure prevails.

Figures 4, 5:
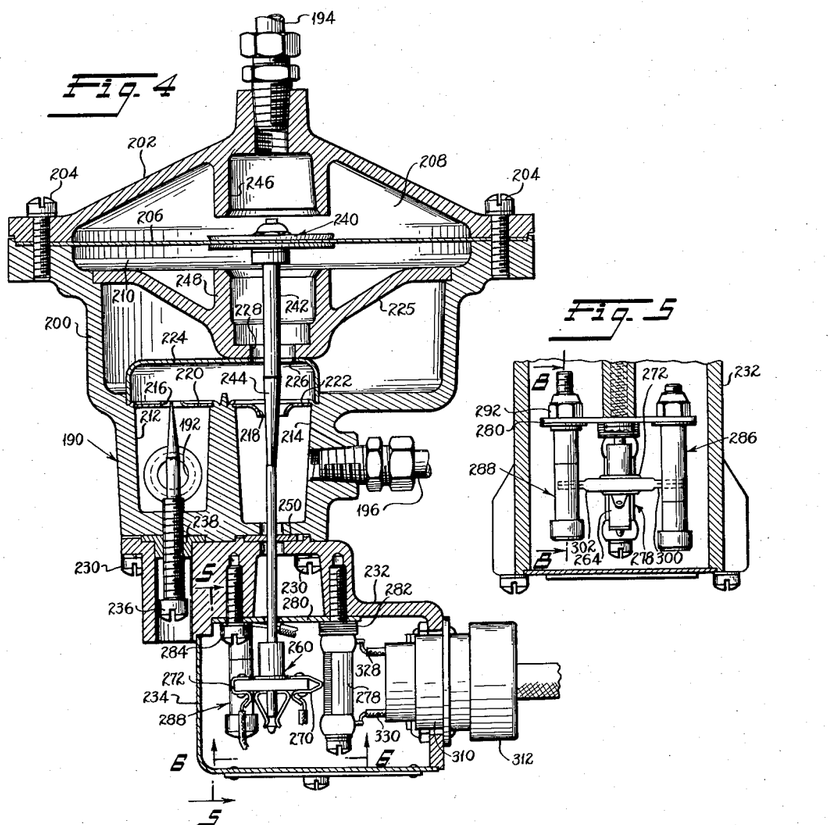
Figure 4 is an enlarged vertical section of the preferred form of the control unit of the present invention taken along line 4—4 of Figure 3.
Figures 5 and 6 are enlarged sectional views taken along lines 5—5 and 6—6 of Figure 4 illustrating details of construction.

The unit 190 includes a main body member 200 and a cover member 202, preferably of die cast aluminum, which have mating circular flanges secured by a plurality of screws 204. Sealingly secured between the mating flanges of the members 200 and 202 is a circular diaphragm 206, preferably fabricated of silicone laminated fiber glass, which is highly flexible, durable and substantially non-resilient. Diaphragm 206 divides the unit 190 into an upper chamber 208 to which the pressure to be controlled is supplied through the pipe 194 and a lower chamber 210 in which a reference pressure is established as will be explained. The body member 200 is provided with two secondary chambers 212 and 214 connected, respectively, to the compressor discharge pressure through conduit 192 and to ambient pressure through conduit 196. The chambers 212 and 214 communicate at their upper ends with the reference pressure chamber 210 through orifices 216 and 218 formed, respectively, in sheet metal plates 220 and 222 which are held in place by peening the upper edge of the chambers 212 and 214. A sheet metal deflector 224 is provided to direct the flow from orifice 216 toward orifice 218 to prevent heat loss and to minimize turbulence within the device. The deflector 224 is supported by a die cast aluminum annulus 225 and the pressure developed between the orifices 216 and 218 is transmitted to the chamber 210 through registering passages 226 and 228 formed in the deflector 224 and the annulus 225.

Secured to the lower end of the body member 200 as by bolts 230 is a secondary die cast aluminum housing 232 which is closed by a sheet metal cover plate 234. An adjusting needle 236, by which the area of orifice 216 may be adjusted for a purpose to appear, is threaded into housing 200 and locked by a Teflon sleeve 238 secured between the housings 200 and 232.

Rigidly secured to the diaphragm 206 by any conventional sealing nut and washer assembly indicated at 240 is a nickel plated brass needle 242 having a tapered control portion 244 preferably having a total taper angle of 6°. The tapered portion of the needle is positioned within the orifice 218 throughout the range of movement of the needle 242 permitted by the hollow bosses 246 and 248 formed in the cover plate 202 and the annulus 225, respectively. The position of the control portion 244 of the needle within orifice 218 and consequently the area of orifice 218 is determined by the respective pressures in chambers 208 and 210 acting on opposite sides of the diaphragm 206. Below tapered portion 244, a uniform section of needle 242 extends through a floating seal 250 preferably of Teflon clamped between the housings 200 and 232.

Figure 6:
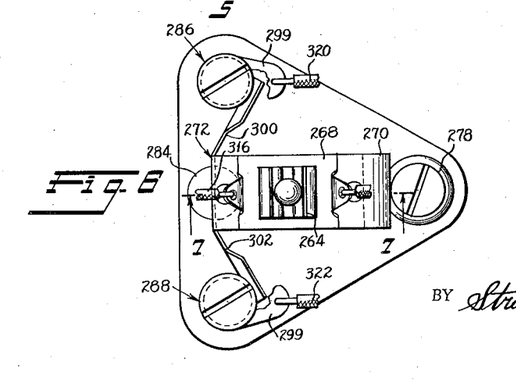

The lower end of the needle 242 within housing 232 carries a wiper assembly indicated generally at 260 and illustrated on enlarged scale particularly in Figures 5, 6 and 7. The wiper assembly is supported on the lower end of needle 242 by means of an aluminum sleeve 262 and is held in place by a clip 264 the free ends of which engage an annular recess 266 at the lower end of the needle. Mounted on the sleeve 262 is a rectangular insulating block 268 of silicone fiber glass laminate. Wiper contacts 270 and 272 are secured by rivets 274 to the opposite ends of block 268. The wiper 270 rides over the surface of a potentiometer 278 which extends through a silicone fiber glass laminate base plate 280 and is threaded into a boss in the housing 232. The position of the potentiometer 278 may be adjusted by the addition or removal of shims 282. The base plate 280, which is also held in place by an additional screw 284 carries a pair of contacts 286 and 288, contact 288 being shown on enlarged scale in Figure 8.

The contact 288 includes a contact post 290 threaded into a self-locking clinch nut 292 mounted on the base plate 280, the clinch nut having a fiber friction lock insert 294. Sleeved over the post 290 and held in place between the head of the post and the base of the clinch nut are fiber insulating sleeve 296 and a silver contact sleeve 298. The contacts 286 and 288 are identical except that on the contact 288 the position of the sleeves 296 and 298 is reversed. Each of the contacts carries a terminal clip 299.

The wiper contact 272 has two spring arms 300 and 302 which yieldingly ride over the surface of the contacts 286 and 288, respectively. The spring arms may be bent slightly if required to provide uniform contact pressures on the contacts 286 and 288 and the potentiometer 278 thus centering the needle.

The leads from the contactors 286 and 288, from the wipers 270 and 272 and from the potentiometer are connected to a standard connector 310 mounted in the housing 232 and adapted to receive a connector plug 312 leading to the nozzle actuating units.

Figure 10:
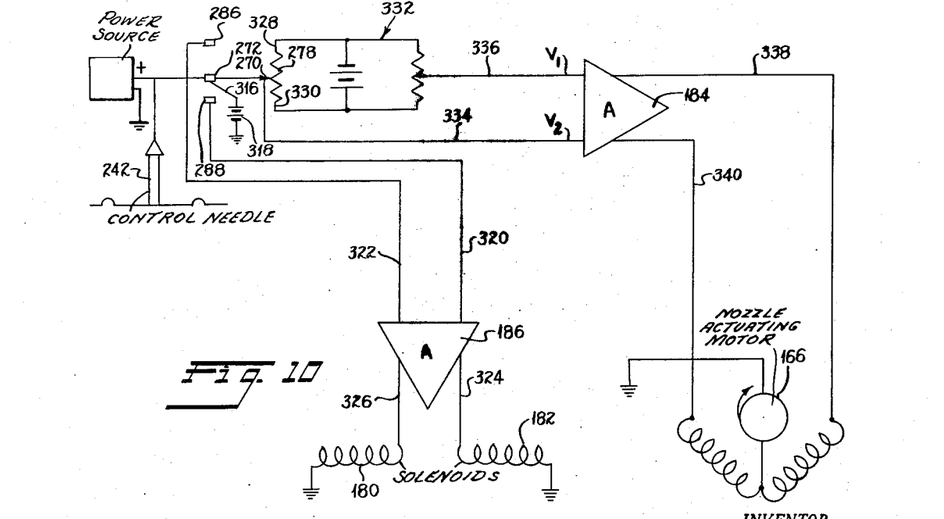

A typical somewhat simplified wiring diagram applicable particularly to the apparatus of Figure 3 is disclosed in Figure 10. As there shown the contact wiper 272 is connected through a lead 316 to a suitable source of potential 318. Accordingly when the needle 242 is moved to its extreme positions into contact with the conducting sleeves of either the contact 286 or the contact 288 a signal is transmitted to the amplifier 186 through one of the leads 320 and 322 thus energizing either one of the coils 180 and 182 through leads 326 and 324 connected to the output side of the amplifier, moving the valve 178 to signal full open or full closing of the nozzle depending upon the direction of movement of the needle 242. However, except during initiation or cessation of afterburning, the wiper 272 will be out of contact with the conducting portions of contacts 286 and 288 and vernier trim of the nozzle will be effected through motor 166 by travel of the wiper 270 over the potentiometer 278 which with its leads 328 and 330 forms a part of a Wheatstone bridge circuit indicated generally at 332. The wiper 270 is connected directly to amplifier 184 through lead 334 and the opposite side of the Wheatstone bridge is connected to the amplifier through lead 336. The output side of the amplifier is connected to the reversing fields of motor 166 through leads 338 and 340. Accordingly, movement of the contact 270 along the potentiometer from its preset neutral position increases either the voltage applied through lead 334 or lead 336 with respect to the other thus revolving the motor 166 in one direction or the other effecting vernier adjustment of the nozzle position.

The circuit of Figure 10, per se, forms no part of the invention and it will be apparent to those skilled in the art that the illustrated circuit may be replaced by other circuits which will actuate the solenoids 180 and 182 upon full travel of the needle 242 and will cause motor 166 to revolve in opposite directions upon displacement of the wiper 270 in opposite directions from its neutral position. It will also be apparent that through the use of conventional circuitry the afterburner fuel and ignition controls can be made operative in response to predetermined movements of the needle 242. For simplicity these additional circuits have been omitted from Figure 10.

Figure 9:
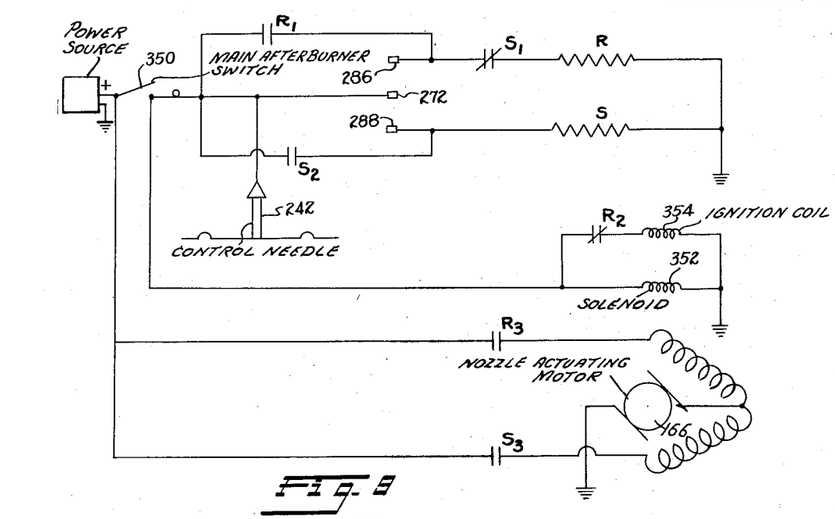
Figures 9 and 10 are schematic wiring diagrams illustrating, respectively, a typical circuit for controlling two-position and continuously variable area jet nozzles.

Figure 9 illustrates a typical circuit for use in controlling a two-position nozzle either with the apparatus of Figure 1 or that of Figure 4 with the potentiometer 278 removed or rendered inoperative. Assuming that the nozzle is fully closed and that afterburning is desired, the main afterburner switch 350 is depressed energizing the fuel valve, not shown, through solenoid 352 and the ignition coil 354 through normally closed relay contacts $R_2$ of relay R. The subsequent increases in tail-pipe pressure moves the contact wiper into contact with the conducting portion of sleeve 286 closing holding contacts $R_1$ of relay R and motor closing contacts $R_3$ to open the nozzle. Normally closed contacts $R_2$ are opened thus cutting off the ignition. If the afterburner blows out the resulting decrease in tail pipe pressure moves contact wiper 272 into contact with the conducting portion of post 288 energizing relay S opening contacts $S_1$ deenergizing relay R, closing motor operating contacts $S_3$ moving the nozzle toward closed position. Ordinarily, in the absence of inadvertent afterburner blowout, the afterburner system is deenergized by opening main afterburner switch 350.

The operation of the entire system of Figures 3 through 8 and 10 will now be described. It will be recalled in connection with the description of the apparatus of Figure 1 that the areas and relationships of the upstream and downstream orifices 107 and 110 are such that the pressure drop across the orifice 107 closely approximates the pressure drop from the discharge side of the compressor through the turbine and the pressure drop across the orifice 110 closely approximates the pressure drop through the tailpipe. Essentially the same condition obtains with respect to the apparatus shown in detail in Figure 4. However, in the apparatus of Figure 1 the downstream orifice is essentially fixed except for provision for a preflight calibration adjustment whereas the downstream orifice 218 of the apparatus of Figure 4 is continuously varied in operation as a function of the differential pressure between chambers 208 and 210. Consequently under all flight conditions regardless of changes of altitude, ambient temperature, air speed or other environmental conditions, a reference pressure is established in chamber 210 which simulates a turbine discharge pressure which is at optimum ratio with the prevailing compressor discharge pressure. As long as the turbine discharge pressure in chamber 208 is exactly equal to the modulating reference pressure in chamber 210 and therefore in optimum ratio with the compressor discharge pressure the diaphragm 206 remains at rest. However, when the pressure in chamber 208 deviates from the established optimum reference pressure in chamber 210 the diaphragm 206 and the needle 242 are moved toward the low pressure area. For example, if the turbine discharge pressure in chamber 208 drops below the reference pressure in chamber 210 the diaphragm 206 moves upwardly as viewed in Figure 4. If the needle 244 were not provided with the tapered control section 244 in the region of orifice 218 the displacement of the diaphragm would continue until physically interrupted. However, as the needle is displaced the size of orifice 218 is increased and the reference pressure in chamber 210 immediately drops and the needle comes to rest when the size of the orifice 218 has been sufficiently increased to lower the pressure in chamber 210 to the exact value of the pressure in chamber 208. This movement of the needle causes a corresponding displacement of the contact 270 along the potentiometer 278 which, in the case of a drop in turbine discharge pressure, activates the motor 166 through the above-described circuit in a direction to move the variable area nozzle towards closed position. By design the amount of deflection of the diaphragm 206 and needle 242 and the amount of resulting change in the area of the orifice 218 are directly proportional to the error existing in the turbine discharge pressure with respect to the compressor discharge pressure and thus afford a direct indication of the corresponding change in nozzle area required to restore the turbine discharge pressure to normal. The diaphragm and needle will remain displaced as long as error exists in the turbine discharge pressure. However, since displacement of the needle produces an immediate corrective signal, in the example given, a nozzle closing signal, correction of the error in turbine discharge pressure is initiated immediately upon displacement of the needle from its neutral position. As the nozzle moves toward closed position and the turbine discharge pressure returns to the desired value, the pressure in chamber 208 increases and becomes greater than the deliberately lowered pressure in chamber 210 and the diaphragm 206 is accordingly displaced in a downward direction as viewed in Figure 4 which ultimately restores the area of orifice 218 to normal thus stabilizing the diaphragm in the original normal position where the contactor 270 occupies a neutral position with respect to the potentiometer 278. It will be understood that although the control device returns to its original position the nozzle will occupy a corrected position.

In the case of a temporarily excessive turbine discharge pressure, the diaphragm is displaced in the downward direction as viewed in Figure 4 thus restricting the area of orifice 218 and raising the pressure in chamber 210. The diaphragm and needle then come to rest when the pressures in chambers 208 and 210 are equal at which time the displacement of the contact 270 on the potentiometer 278 signals an opening movement of the nozzle of the correct magnitude thus restoring the apparatus to its normal balanced condition. Since the correction of turbine discharge pressure and the movement of the diaphragm 206 and the needle 242 take place simultaneously and at substantially the same rate, over-compensation, hunting and resilient or pendulum action are eliminated and the needle has little tendency to move past its balanced point.

It has been found in practice that the above-described system will reflect fluctuations in turbine discharge pressure within .01 second. This extremely rapid response is obtained since the unit measures pressure changes directly and avoids time delays inherent in an indirect system which utilizes an associated variable such as temperature. By sensing pressure directly the apparatus of the present invention provides immediate signals and the nozzle area is corrected before other variables are seriously effected.

While the above-described functions are predicated on a more or less minor variation in turbine discharge pressure, essentially the same action takes place upon major variations in turbine discharge pressure such as, for example, those occasioned by afterburner light-off or blowout. In this event the diaphragm is displaced rapidly until the contact wiper 272 contacts one of the uninsulated portions of the contacts 286 and 288 thus signalling for immediate full movement of the variable nozzle in the direction desired either to fully open or fully closed position. The signal activates the power mechanism 174 for rapidly moving the nozzle and the trimming action signalled by the potentiometer and the motor 166 is overridden. As soon as sufficient correction has taken place to return the contact wiper 272 to the insulated portions of the contacts 288 or 286, the final trimming action is accomplished through the agency of the motor 166.

Regardless of the magnitude of pressure change and regardless of the altitude, air speed, r.p.m. or ambient temperature the diaphragm deflection is always a function of the error in nozzle area and the difference between the actual pressure ratio and the desired normal pressure ratio, since the orifices and pressure ratios in the device 190 exactly parallel those of the engine. If at sea level static a change of 10% in the ratio between turbine discharge pressure and compressor discharge pressure displaces the diaphragm sufficiently to move the needle .031 inch the same displacement would be caused by a 10% variation in the ratio at altitudes of 60,000 feet or higher. These remarkable results have been substantiated by actual test and clearly establish that the apparatus of the present invention is inherently self-compensating despite variations in operating and ambient pressure levels.

The control unit is calibrated for a particular engine primarily by varying the area of the orifice 216 by the adjustment of needle 236. This adjustment is made so that the wiper contact 270 occupies the neutral position on the potentiometer 278 when the pressure in the engine tail pipe is "normal." Further adjustments may be made by displacement of the potentiometer by the addition or removal of the shims 282 or by repositioning the contacts 286 and 288.

As stated above, it is desirable in a jet engine to render the control unit non-responsive to minor transient variations in turbine tail-pipe pressures and accordingly a "dead band" is ordinarily incorporated in the circuit. This dead band normally renders the unit insensitive to departures of plus or minus .5% from the normal tail-pipe pressure. Since the control unit is substantially uneffected by changes in the operating or ambient pressure levels, the dead band when properly set at sea level will remain constant for all flight altitudes. Since at flight altitudes a departure of plus or minus .5% from the normal tailpipe pressure will produce the same movement of the wiper along the potentiometer and thus will produce a uniform voltage differential at all flight altitudes, the dead band may be established by rendering the amplifier insensitive to a predetermined minimum voltage differential. It will be apparent to those skilled in the art that the dead band may easily be established in other conventional ways because of its uniformity at all flight altitudes.

In the preferred embodiment of the invention the potentiometer 278 has a power rating of five watts and may be utilized without the amplifier to operate relays, proportional solenoid valves, magnetic amplifiers or other means of amplification not requiring thermionic tubes. Where space and weight limitations permit the use of the necessary electronic controls, a variable speed nozzle actuating motor may be used so that the rate of correction effected by the motor will be directly proportional to the amount of change required. Essentially the same result may be obtained through the use of simpler controls by utilizing a constant speed motor which is pulsed to obtain a slower rate of actuation than would result from a continuous motor operation.

The invention has been thus far described as a control element for a jet engine with an afterburner and variable area nozzle because it is in such an environment that the unique advantages of the invention have been most fully and effectively realized at the present time. However, the unique properties of the device also render it suitable for many other widely varying applications such as those shown for example in Figures 11, 12 and 13 which will now be described.

Figure 11:
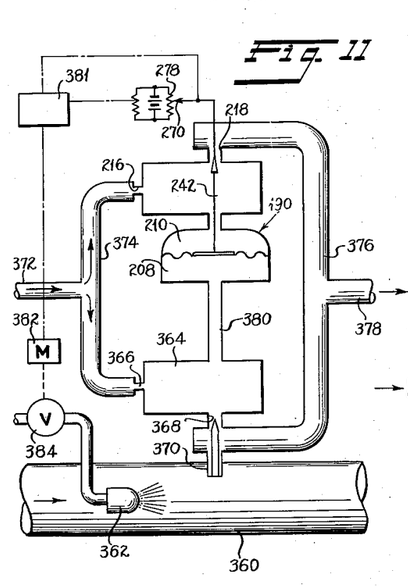
Figure 11 is a schematic illustration of the invention utilized as a remote temperature control.

Referring now in detail to Figure 11 the present invention is there shown as applied to the control of temperature in a blast furnace where the controls are preferably at a distance from the furnace. The control unit 190 shown schematically in Figure 11 may be identical to that described in detail particularly in connection with Figure 4. Whereas in the embodiment above-described, the control unit 190 is connected in parallel with the jet engine, that is, the duct to be controlled, the control unit in Figure 11 is connected in parallel with a duct system which is independent of the duct to be controlled which in Figure 11 is the combustion tube 360 of a blast furnace to which fuel is supplied through a nozzle 362.

The secondary duct system comprises a chamber 364 having a restricted inlet orifice 366 and an outlet orifice 368 the area of which is varied by a temperature sensitive element 370, for example, a quartz needle in a metal container, the needle being withdrawn from the orifice 368 upon an increase in temperature in the tube 360. Air or other suitable fluid, for example, shop air, usually supplied at a pressure from 20 p.s.i.a. to 100 p.s.i.a., is applied to the chambers 210 and 364 from a common inlet 372 through conduit 374. The respective outlet orifices 218 and 368 of the chambers 210 and 364 are connected to ambient pressure through conduits 376 and 378. The pressure developed in chamber 364 is communicated directly to the chamber 208 of the control unit through a substantially unrestricted conduit 380. The contact wiper and the potentiometer 278 of the control unit are connected through a suitable amplifier 381 and conventional circuitry to a reversible motor 382 which actuates a fuel control valve 384.

In operation, when the air supply to the combustion tube 360 varies, assuming a constant fuel flow, there is an immediate temperature change in the tube 360. Assuming that the air flow through duct 360 decreases, producing a temperature increase, the temperature responsive element 370 will increase the effective area of orifice 368 dcreasing the pressure in chamber 364. The decrease in the pressure in chamber 364 is immediately communicated to the chamber 208 and produces downward movement of the needle 242 by an amount which is a function of the temperature change indicated by the unit 370 and consequently a function of the required correction in the rate of fuel flow through nozzle 362. The resulting displacement of the wiper 270 with respect to the potentiometer signals the required decrease in fuel flow. As the fuel flow is decreased the effective area of orifice 368 is also again progressively decreased increasing the pressure in chambers 364 and 208 moving the needle 242 upwardly towards its neutral position and when the temperature in the tube 360 returns to its predetermined normal the system is again in balnace. It will be apparent that an increase in air flow in tube 360, producing a decrease in temperature, will result in an immediate increase in fuel flow to maintain the temperature in tube 360 at its desired level. This system is particularly effective in industrial applications where, as in most cases, a variable source of air pressure is available since the control is entirely independent of variations in the pressure applied to the system through conduit 372 and also independent of variations between the ratio of the pressures in the supply and exhaust conduits 372 and 378. As pointed out above the unit of the present invention always has the same magnitude of response to a given change in the condition sensed regardless of variations in operating or ambient pressures.

Figure 12:
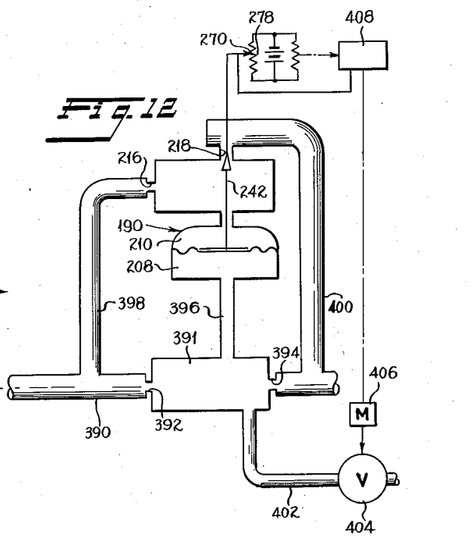
Figures 12 and 13 are schematic views of the present invention utilized as a flow ratio control device.
Figure 13:
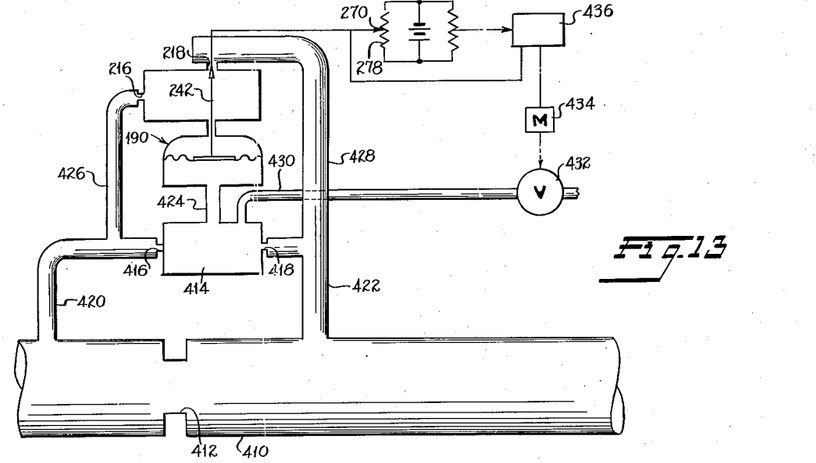

Figures 12 and 13 illustrate the invention as a part of a flow ratio control system to control the rate of addition of a fluid to maintain a constant flow ratio with another fluid flowing at a variable rate. Such systems have widespread commercial applications as for example for the mixing of paints, fuels or medicines in large quantities, or in a city water fluorination system where the ratio of fluorine added to the water must be maintained at a constant level regardless of variations in the flow of the water.

Each of the systems of Figures 12 and 13 are suitable for any of these applications. For purposes of illustration the water fluorination system will be described.

With further reference to Figure 12, 390 indicates a city water main having a flow chamber 391 between upstream and downstream orifices 392 and 394. The chamber 391 is in direct communication with chamber 208 of the control unit through an unrestricted conduit 396 and the reference pressure chamber 210 of the control unit is connected in parallel with the chamber 391 through inlet and outlet conduits 398 and 400. Fluorine is added to the chamber 391 through a conduit 402 at a rate determined by the setting of valve 404 which is controlled by a motor 406 in response to signals from the control amplifier 408. The apparatus of Figure 12 is preset so that the desired ratio of fluorine and water flowing through orifice 394 is maintained when the contact wiper 270 occupies its neutral position on the potentiometer 278. If the water supply pressure falls, the pressure in chambers 391 and 208 will exceed the reference pressure in chamber 210 because of the excessive flow of fluorine. Accordingly, the needle 242 will be urged into the orifice 218 and its displacement will be continued until the pressure in chamber 210 equals the pressure in chambers 391 and 208. The corresponding movement of the contact wiper 270 on the potentiometer 278 will produce a control signal to actuate the valve 404 to decrease the flow of fluorine decreasing the pressure in chambers 391 and 208 causing the system to return to its neutral position at which time the flow ratio is again established at the desired value. If the flow of fluorine decreases with respect to the water flow through the main 390 the reference pressure in chamber 210 will exceed the pressure in chambers 208 and 391, the needle 242 will be withdrawn from the orifice 218 until the pressures in chambers 208 and 210 are equalized and the required correction of the setting of valve 404 is made. Again the apparatus of the present invention is of particular utility because it functions to maintain the desired flow ratio regardless of variations in the water main pressure or flow rate. The system of Figure 13 is similar to that of Figure 12 except that the control pressure is developed in a conduit system independent of the water main.

With continuing reference to Figure 13 the water main 410 is provided with a single restriction 412, and a control chamber 414 having entrance and exit orifices 416 and 418 respectively, is connected to the water main at points upstream and downstream of restriction 412 through conduits 420 and 422, respectively. The chamber 414 is in communication with the chamber 208 of the control unit 190 through an unrestricted conduit 424 and the chamber 210 of the control unit is arranged in parallel with the chamber 414 by means of conduits 426 and 428. Fluorine is supplied to the chamber 414 through a conduit 430 at a rate determined by the setting of valve 432 in turn controlled by a motor 434 activated by the control amplifier 436.

If the pressure in the main 410 decreases, the pressure in chamber 210 decreases with respect to the chambers 208 and 414 because of the excessive flow of fluorine and the corrective action is effected in exactly the same manner as that described in connection with Figure 12 to establish the desired flow ratio.

While the invention has been described in connection with three of its major applications it is to be understood that these examples are given by way of illustration only and that the present invention has many other commercial and military applications where close regulation of fluid flow systems is required. For example the invention can be utilized to control both a variable area nozzle and afterburner fuel supply in a jet engine or it may be used to control stationary turbine power plants in a variety of ways. It is also adaptable to the control of pressurizing systems, air conditioning systems, wind tunnels, turbo-supercharging systems and similar systems.

In addition to its utilization as a control it may also provide a reliable indicating apparatus. For example, in the apparatus of Figure 11 it was pointed out that the displacement of the needle 242 is directly proportional to the variation in temperature. Accordingly through the use of conventional mechanisms the displacement of the needle can be used to indicate temperature directly. Similarly in the major embodiment of the present invention the displacement of the needle is proportional to pressure variations and accordingly the invention may provide a direct pressure reading through the use of conventional mechanisms. The units herein disclosed may also be used as a Mach meter.

In all of its application the desired results are obtained from the use of the basic combination including a first duct, a second duct which is an analog of the first duct, means having substantially no mechanical resilience responsive to pressure differentials between said ducts and means responsive to the pressure sensitive means to provide a direct indication of a condition in the first duct or to control one of the conditions in the first duct.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gaseous turbine power plant including a compressor, a control assembly comprising a chamber having an inlet orifice connected to be subject to the compressor discharge pressure and an outlet orifice connecting said chamber to a pressure below the turbine discharge pressure, a movable pressure responsive device connected to the subject to the pressure in said chamber and to the turbine discharge pressure, a control element movable with said pressure responsive device and extending through one of said orifices to vary the area of one of said orifices upon displacement of said pressure responsive member, the effective area and configuration of said orifices being so related when said pressure responsive device is in its neutral position as to establish in said flow chamber a pressure substantially equal to the normal turbine discharge pressure, and means responsive to displacement of said pressure responsive device when said turbine discharge pressure departs from its normal value for restoring said turbine discharge pressure to its normal value.

2. Apparatus for indicating variations from normal of the turbine discharge pressure of a gaseous turbine power plant having a compressor, comprising a chamber having an inlet orifice connected to be subject to the air compressor discharge pressure and an outlet orifice connecting said chamber and a pressure below said turbine discharge pressure, a movable pressure responsive device connected to be subject to the pressure in said chamber and to said turbine discharge pressure, a control element movable with said pressure responsive device and extending through one of said orifices to vary the area of one of said orifices upon displacement of said pressure responsive device, the effective area and configuration of said orifices being so related when said pressure responsive device is in its neutral position as to establish in said flow chamber a pressure substantially equal to said normal turbine discharge pressure, whereby a displacement of said pressure responsive device from its neutral position is indicative of a departure of said turbine discharge pressure from its normal value.

3. In a fluid operated mechanism having a flow of fluid through a main chamber under variable pressure, said main chamber having a restricted entrance and exit, an auxiliary flow chamber having an inlet orifice and an outlet orifice, means connecting the entrance of said main chamber and said inlet orifice with a common fluid pressure source, the exit of said main chamber and said outlet orifice exhausting to a pressure lower than the pressure in said main chamber, a movable pressure responsive device connected to be subject to the pressure in said chambers, a control element movable with said pressure responsive device and extending through one of said orifices to vary the area of one of said orifices upon displacement of said pressure responsive device, the effective area and configuration of said orifices being so related when said pressure responsive device is in its neutral position as to establish in said flow chamber a pressure substantially equal to a desired pressure in said main chamber, and operating control means responsive to movement of said pressure responsive device when the pressure in said main chamber departs from said desired value to vary the restricted exit of said main chamber for restoring the pressure in said main chamber to its desired value.

4. A fluid pressure operated mechanism having a flow of fluid through a main chamber under variable pressure, said main chamber having a restricted entrance and exit formed respectively by entrance and exit orifices; means forming an auxiliary flow chamber having a restricted entrance and exit formed respectively by entrance and exit orifices; means connecting the entrance of each of said chambers with a common fluid pressure source, the exit of each of said chambers exhausting to a pressure below the pressure in said main chamber, a movable pressure responsive device connected to said chambers and normally occupying a neutral position and movable away from said neutral position in response to differential pressures between said chambers; a control element movable with said pressure responsive device and extending through one of said orifices to vary the area of one of said orifices upon displacement of said pressure responsive device, the effective area and configuration of said orifices being so related when said pressure responsive device is in its neutral position as to establish in said flow chamber a pressure in constant ratio to the pressure at said common source, and means responsive to displacement of said element away from said neutral position to generate a signal when a differential pressure exists between said chambers.

5. In a variable pressure system comprising a first pressure zone and a second pressure zone, a device for measuring changes in ratio between the pressure in the first and second pressure zones, said device comprising a chamber, a freely movable pressure responsive device dividing said chamber into two compartments, a restricted inlet orifice in one compartment connected to the first pressure zone and a restricted outlet orifice in said one compartment leading to a pressure below the pressure in said one compartment, an inlet in the other compartment connected to the second pressure zone, said pressure responsive device being subjected to the pressures in both compartments, an orifice control member connected with the pressure responsive device and extending through one of said orifices to vary the area of the orifice upon displacement of the pressure responsive device thereby to bring the pressure in said one compartment into balance with the pressure in the other compartment, the effective area and configuration of the orifices and orifice control member being such that the pressure responsive device is in its neutral position when the ratio of the pressures in the pressure zones has a predetermined normal value.

6. The system as defined in claim 5 together with operating control means responsive to movement of the orifice control member when the pressure responsive device is moved from its neutral position to restore the ratio of the pressures in the first and second pressure zones to said normal value.

7. In a turbine engine having an air compressor, a turbine, and regulating means for varying the turbine discharge pressure, apparatus for maintaining the ratio between the compressor discharge pressure and turbine discharge pressure at a predetermined normal value comprising a chamber, a pressure responsive device dividing said chamber into two compartments, a restricted fluid inlet orifice in one compartment connected with the compressor discharge pressure and a restricted fluid outlet orifice in said one compartment leading to a pressure below said turbine discharge pressure, an inlet in the other compartment connected with the turbine discharge pressure, said pressure responsive device being subjected to the pressures in both compartments and being freely movable in response to changes therein, an orifice control member connected with the pressure responsive device and extending through one of said orifices to vary the area of the orifice upon displacement of the pressure responsive device thereby to bring the pressure in the said one compartment into balance with the pressure in the other compartment, the effective area and configuration of the orifices and the orifice control member being such that the pressure responsive device is in its neutral position when the ratio of the compressor discharge pressure to the turbine discharge pressure has said predetermined normal value, and operating control means responsive to movement of the orifice control member when the pressure responsive device is moved from its neutral position to restore the ratio of the compressor discharge pressure to the turbine discharge pressure to said normal value.

8. In a turbojet engine having an afterburner and a fully variable nozzle through which the propulsive gases flow, and an actuator for said nozzle; apparatus for maintaining the ratio between the compressor discharge pressure and turbine discharge pressure at a predetermined normal value under all operating conditions comprising a chamber, a freely movable pressure responsive device dividing said chamber into two compartments, a restricted fluid inlet orifice in one compartment connected with the compressor discharge pressure and a restricted fluid outlet orifice in said one compartment leading to a pressure below said turbine discharge pressure, an inlet in the other compartment connected with the turbine discharge pressure, said pressure responsive device being subjected to the pressures in both compartments and being freely movable in response to changes therein, an orifice control member connected with the pressure responsive device and extending through one of said orifices to vary the area of said one orifice upon displacement of the pressure responsive device thereby to bring the pressure in said one compartment into balance with the pressure in the other compartment, the effective area and configuration of the orifices and the orifice control member being such that the pressure responsive device is in its neutral position when the ratio of the compressor discharge pressure to the turbine discharge pressure has said predetermined normal value, and operating control means responsive to movement of said pressure responsive device away from its neutral position to operate said nozzle actuator to move said nozzle to restore the ratio of the compressor discharge pressure to the turbine discharge pressure to said normal value.

References Cited in the file of this patent

UNITED STATES PATENTS

| | | |
|---|---|---|
| 436,235 | Griffin | Sept. 9, 1890 |
| 2,082,940 | Brisbane et al. | June 8, 1937 |
| 2,312,880 | Coffee | Mar. 2, 1943 |
| 2,333,775 | Gille | Nov. 9, 1943 |
| 2,580,962 | Sedille | Jan. 1, 1952 |
| 2,600,073 | Plank | June 10, 1952 |
| 2,623,352 | Sedille et al. | Dec. 30, 1952 |
| 2,649,108 | Best et al. | Aug. 18, 1953 |
| 2,632,474 | Jones | Mar. 24, 1953 |
| 2,641,324 | Fortescue | June 9, 1953 |
| 2,677,233 | Jordan | May 4, 1954 |
| 2,746,242 | Reed | May 22, 1956 |

FOREIGN PATENTS

| | | |
|---|---|---|
| 278,689 | Germany | Oct. 2, 1914 |
| 636,879 | Germany | Oct. 19, 1936 |
| 634,095 | Great Britain | Mar. 15, 1950 |